W. W. MOORE.
SPADING MACHINE.
APPLICATION FILED NOV. 14, 1911. RENEWED OCT. 14, 1912.
1,062,570.
Patented May 20, 1913.
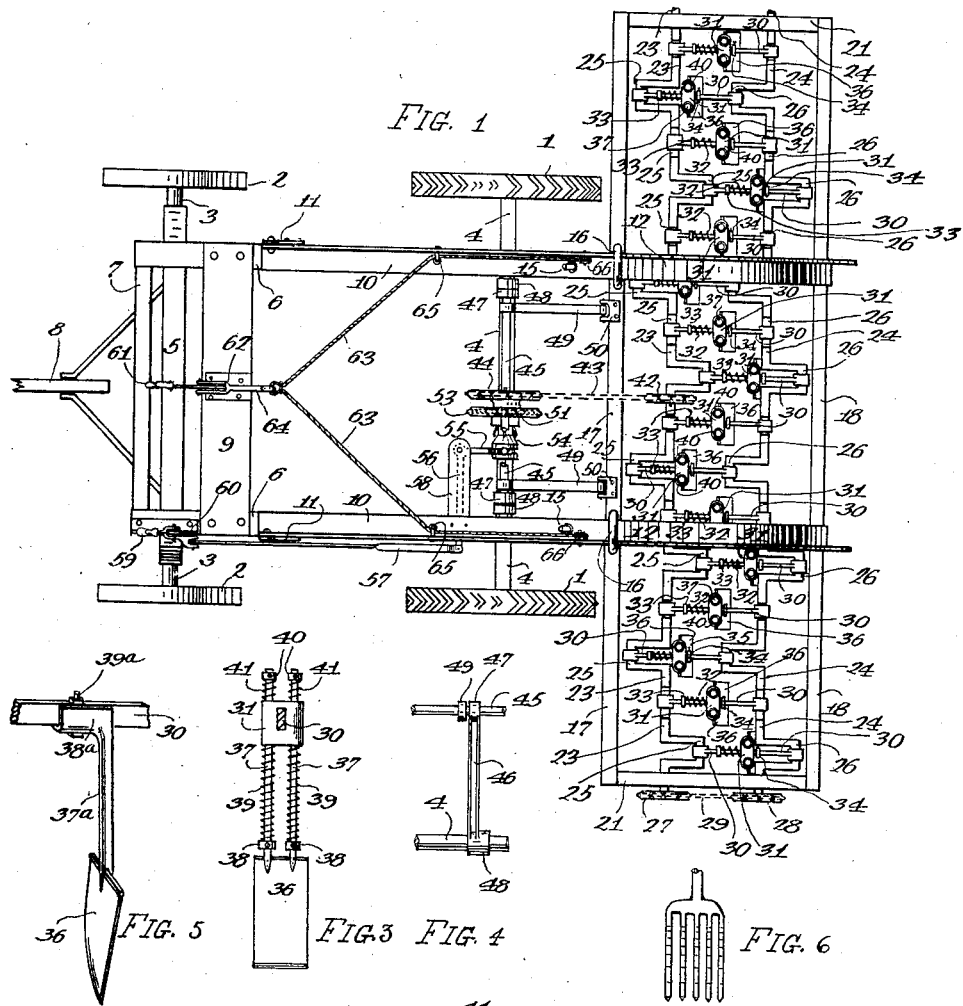
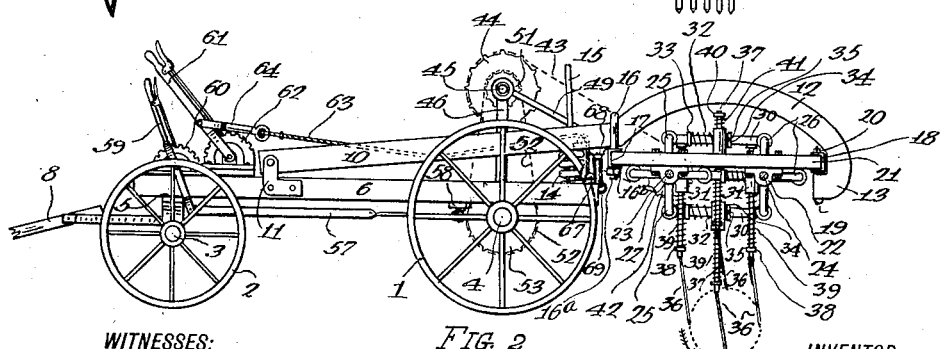
WITNESSES:
M. S. Crandall
W. S. Dye
INVENTOR
W. W. MOORE
BY
H. C. Gardiner
ATTORNEY

UNITED STATES PATENT OFFICE.

WALTER WIRT MOORE, OF SIOUX CITY, IOWA.

SPADING-MACHINE.

1,062,570. Specification of Letters Patent. Patented May 20, 1913.

Application filed November 14, 1911. Serial No. 660,279. Renewed October 14, 1912. Serial No. 725,707.

*To all whom it may concern:*

Be it known that I, WALTER WIRT MOORE, a citizen of the United States, residing at Sioux City, in the county of Woodbury and State of Iowa, have invented certain new and useful Improvements in Spading-Machines, of which the following is a specification.

My invention relates to agricultural implements and particularly to the kind used in the cultivation of the soil.

The object of the invention is the construction of a machine for doing the work of digging which has hitherto been done by hand, for cultivation of the ground in a thorough and expeditious manner, and combining in one machine the means for stirring the soil after the manner of cultivators and inverting it in the way accomplished by plows.

The invention consists in the new and improved construction of the device hereinafter described, the arrangement and combination of parts and generally in the means for accomplishing the objects mentioned, as will be described and claimed in this specification.

I have illustrated my invention in the accompanying drawing in which—

Figure 1 is a plan view of my invention, some of the minor parts being shown in broken lines and the sprocket wheels and chain being omitted from one end. Fig. 2 is a view of the same in side elevation, the end sprocket wheels and chain being omitted and the shafts being broken off. Fig. 3 is an enlarged detail view of one of the spades and connections used in the device. Fig. 4 is a detail view of support for sprocket wheel. Fig. 5 is a detail view of modified form of digging device and its connection. Fig. 6 is another form of digging tool.

In the drawings 1, 1 are the drive wheels of the machine and 2, 2 the fore wheels which support the frame of the machine. The fore wheels are mounted on the axle 3 while the drive wheels are mounted on the rear axle 4. On the forward axle a bolster 5 is mounted in the usual way and to it are secured the side bars 6, the rear ends of which rest upon the rear axle. The front ends of the side bars are connected by a cross piece 7 and a tongue 8 is connected to the bolster for pulling the machine. A plate or platform 9 connects the side bars just to the rear of the fore wheels and supports one of the levers and may be used for a seat support. Near the forward end of the cross bars and in rear of the platform are pivoted the front ends of hang bars 10, made of angle iron, by means of the castings 11 secured to the side bars. The hang bars extend to the rear of the trucks where they curve upwardly and extend rearwardly of the trucks where the digging devices are suspended, the bowed portions 12 of the hanger bars terminating in the shape of forwardly extending hooks 13. The rear ends of the hang bars are elevated and rest upon coil springs 14 which encircle pins 15 secured to the side bars 6 and projecting upwardly through the hang bars, giving resiliency to the frame supported by the hang bars. From the rear of the hang bars are suspended hangers 16 which inclose the bars and support the cross bar 17 at right angles. The hangers 16 terminate underneath the hang bars in bolts $16^a$ which pass through the cross bar 17 and secure it by nuts $16^b$. On the ends of the hooks 13 is supported a similar bar 18 which is secured to the hooks by bolts 19 and nuts 20. The ends of the bars 17 and 18 are connected by end pieces 21. Secured to the latter are bearings 22 which support the shafts 23 and 24 having a plurality of crank arms, 25 and 26. To the ends of the shafts 22 and 23 are secured sprocket wheels 27 and 28 connected by chains 29. The respective sets of crank arms, 25 and 26, are connected by a series of rods 30 which pass freely through blocks 31 from which the digging devices are suspended. That part of the connecting rods in front of the blocks is round while the part in the rear is rectangular in shape, as seen in Fig. 3. Coil springs 32 encircle the connecting rods in front of the blocks, abutting at the front end against the rings 33 made integral with the rods. To the rear of the blocks collars 34 are adjustable on the connecting rods by means of set screws 35 and may be moved on the rods and secured in any given place to regulate the tension of the springs. The tools 36 are shaped much like a garden spade but have two parallel handles or shanks 37 secured to the blades and extending from the blades up freely through the blocks 31. Above the spade blades adjustable collars 38 are secured to the shanks and between said collars and the blocks the shanks are encircled by coil springs 39. To the upper ends of the shanks above the blocks are secured adjustable collars 40 and between said collars and the blocks the shanks are encircled by coil springs 41. The springs on the shanks prevent the jar of sudden contact with the ground and avoid breakage, while the springs on the connecting rods permit a limited yielding of the spades laterally in lifting the dirt.

On the center of the forward shaft 23 is secured a sprocket wheel 42 which is operated by means of a chain 43 connected to a sprocket wheel 44 secured to a shaft 45 which is supported by uprights 46, the upper and lower ends of which terminate in bearings 47 and 48, the former being mounted on the shaft 45 and the latter on the axle 4. The shaft 45 is further supported by braces 49, one end of which terminates in bearings inclosing the shaft 45, the other ends being pivotally secured to the bar 17 by hinges 50. Secured also to the shaft 45 is a similar sprocket wheel 51 which is operated by a chain 52 connecting it with a sprocket wheel 53 movable on the axle 4. The wheel 53 is moved in and out of gear on the axle 4 by means of a cone clutch 54, operated by the levers 55, 56 and 57, the levers 55 and 56 being integral and pivotally supported by a plate 58 secured to one of the side bars and controlled by the hand lever 59 adjusted to the slotted bar 60.

The pivoted frame supporting the digging devices may be raised and lowered and the depth of cultivation regulated by means of the hand lever 61 operated on the slotted bar 62, secured to the plate 9 and to which are connected the cables 63 by means of the link 64. The cables pass over pulleys 65 and 66 supported on the inside of the hang bars 10, through openings in the hang bars and under pulleys 67 on the side bars 6, over pulleys 68 on the lower side of the hang bars and the rear ends are secured to rings 69 secured to the rear ends of the side bars 6. The connection of the lifting device and the number of pulleys render the operation of lifting easy. The frame supporting the digging devices rests upon the springs 14 and is lowered by the lever 61 and its connections against the tension of the springs which operate to raise it.

In Fig. 5 is shown another method of securing the spades to the connecting rods, the single shank 37ª being heavier than in the first form and secured directly to the connecting rod by a clamp 38ª integral with the shank and secured by bolts 39ª. This form is especially adapted for use in hard ground offering the greatest resistance to the spades. In Fig. 6 the digging tool is a fork which may be attached to the connecting rod in a manner similar to that shown in Fig. 5 and is especially adapted for rocky or gravelly soil.

The operation of my cultivator is as follows: As the machine is driven over the field the crank shaft 23 is operated by the wheels 1, axle 4, sprocket wheels 44, 51, 53 and 42, and chains 52 and 43. The connecting rods and the sprocket wheels and chains at the ends of the shaft operate the rear shaft 24 simultaneously with the front shaft. The cranks are so arranged on the shafts that the same number of spades are in contact with the soil at all times, the spades being so spaced laterally that none of the soil is left uncultivated. As the spades describe a complete circle, as the soil is gathered on the spades it is thrown backward, upward and forward, thus being completely turned over and at the same time being broken up and pulverized. The springs on the shanks of the spades and connecting rods remove violence of motion and promote ease of operation, which may be further increased by the use of ball bearings for the connecting rods and cranks. They may also be used for all the bearing parts.

The depth of operation may be regulated by raising or lowering the hang bars by means of the controlling lever, and when not in operation the whole spading device can be lifted clear of the ground and the machine driven as an ordinary conveyance.

Having described my invention what I claim as new and desire to secure by Letters Patent, is,—

1. The combination with drive wheels and a frame, parallel shafts rotatably supported by the frame and having a plurality of crank arms, and means connecting the drive wheels with the shafts for the operation of the shafts, of rods connecting the crank arms of each shaft, digging tools adapted for cultivation of the ground, means adjustably securing the tools to the connecting rods whereby the tools are forced into the ground, springs on the connecting rods for permitting a lateral yielding of the tools, and springs on the securing means for mitigating the vertical jar of contact with the ground.

2. The combination with drive wheels and a supporting frame and hang bars pivotally secured to the frame, of shafts having a plurality of crank arms rotatably supported by the hang bars, means connected with the wheels for driving the shafts, rods connected to and operated by the crank arms, blocks movable on the connecting rods, digging tools having shanks adjustable in said blocks and springs on the shanks for mitigating the jar of contact with the ground.

3. The combination with drive wheels, a supporting frame, hang bars pivotally secured to the frame and means for raising and lowering said hang bars, of parallel shafts having a plurality of crank arms rotatably supported by the hang bars, means for driving the shafts, rods connecting the crank arms on each shaft, blocks movable on the connecting rods, springs on the connecting rods in front of the blocks and digging tools having shanks adjustable in said blocks.

In testimony whereof I have hereunto signed my name to this specification in the presence of two subscribing witnesses.

WALTER WIRT MOORE.

Witnesses:
H. C. GARDINER,
A. D. COLLIER.

Copies of this patent may be obtained for five cents each, by addressing the "Commissioner of Patents, Washington, D. C."